(12) United States Patent
Gauthier et al.

(10) Patent No.: US 7,220,806 B2
(45) Date of Patent: May 22, 2007

(54) PROCESS FOR INCREASING ETHYLENE INCORPORATION INTO RANDOM COPOLYMERS

(75) Inventors: William John Gauthier, Houston, TX (US); Jun Tian, LaPorte, TX (US); David John Rauscher, Angleton, TX (US); Constance Hayworth Patrick, Conroe, TX (US); Shady Nader Henry, Seabrook, TX (US); Nathan Williams, Webster, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/119,243

(22) Filed: Apr. 29, 2005

(65) Prior Publication Data
US 2006/0247395 A1 Nov. 2, 2006

(51) Int. Cl.
*C08F 4/76* (2006.01)
*C08F 4/52* (2006.01)

(52) U.S. Cl. .................. 526/170; 525/160; 525/943; 525/348

(58) Field of Classification Search ............ 526/160, 526/170, 943, 941, 130, 129, 905, 64, 65, 526/903, 348, 336
See application file for complete search history.

(56) References Cited

U.S. PATENT DOCUMENTS

| | | | |
|---|---|---|---|
| 4,271,060 A | 6/1981 | Hubby ................. 260/33.6 A |
| 4,543,399 A | 9/1985 | Jenkins, III et al. .......... 526/70 |
| 4,588,790 A | 5/1986 | Jenkins, III et al. .......... 526/70 |
| 5,001,205 A | 3/1991 | Hoel ........................ 526/128 |
| 5,026,798 A | 6/1991 | Canich ..................... 526/127 |
| 5,028,670 A | 7/1991 | Chinh et al. ................ 526/73 |
| 5,212,247 A * | 5/1993 | Asanuma et al. ........... 525/240 |
| 5,225,501 A * | 7/1993 | Fujita et al. ............... 526/127 |
| 5,236,998 A | 8/1993 | Lundeen et al. ............. 525/52 |
| 5,317,036 A | 5/1994 | Brady, III et al. .......... 523/223 |
| 5,405,922 A | 4/1995 | DeChellis et al. ............ 526/68 |
| 5,436,304 A | 7/1995 | Griffin et al. ............... 526/68 |
| 5,462,999 A | 10/1995 | Griffin et al. ............... 526/68 |
| 5,498,581 A * | 3/1996 | Welch et al. ............... 502/102 |
| 5,525,678 A | 6/1996 | Mink et al. ................ 525/246 |
| 5,589,555 A | 12/1996 | Zboril et al. ................ 526/64 |
| 5,616,661 A | 4/1997 | Eisinger et al. .............. 526/88 |
| 5,627,242 A | 5/1997 | Jacobsen et al. ............. 526/60 |
| 5,643,847 A | 7/1997 | Walzer, Jr. ................. 502/117 |
| 5,665,818 A | 9/1997 | Tilston et al. ................ 525/53 |
| 5,668,228 A | 9/1997 | Chinh et al. ................ 526/67 |
| 5,677,375 A | 10/1997 | Rifi et al. .................... 525/53 |
| 5,703,187 A | 12/1997 | Timmers .................... 526/282 |
| 5,747,406 A | 5/1998 | Reichle et al. .............. 502/117 |
| 5,830,968 A * | 11/1998 | Sadatoshi et al. ......... 526/348.1 |
| 5,849,852 A | 12/1998 | Koch et al. ................. 526/96 |
| 5,869,723 A | 2/1999 | Hinokuma et al. ......... 556/402 |
| 6,069,213 A | 5/2000 | Nemzek et al. ............. 526/113 |
| 6,147,173 A | 11/2000 | Holtcamp ................... 526/133 |
| 6,180,732 B1 * | 1/2001 | Ewen ......................... 526/127 |
| 6,180,735 B1 | 1/2001 | Wenzel ....................... 526/142 |
| 6,184,318 B1 * | 2/2001 | Razavi et al. ............... 526/160 |
| 6,207,606 B1 | 3/2001 | Lue et al. .................... 502/113 |
| 6,211,105 B1 | 4/2001 | Holtcamp ................... 502/103 |
| 6,218,330 B1 * | 4/2001 | Razavi et al. ............... 502/107 |
| 6,242,545 B1 | 6/2001 | Jejelowo et al. ............ 526/160 |
| 6,245,705 B1 | 6/2001 | Kissin ........................ 502/117 |
| 6,245,868 B1 | 6/2001 | Agapiou et al. .............. 526/88 |
| 6,248,845 B1 | 6/2001 | Loveday et al. ............ 526/113 |
| 6,255,425 B1 * | 7/2001 | Asanuma et al. ........... 526/348 |
| 6,271,323 B1 | 8/2001 | Loveday et al. ............ 526/161 |
| 6,274,684 B1 | 8/2001 | Loveday et al. ............ 526/114 |
| 6,300,436 B1 | 10/2001 | Agapiou et al. ............ 526/154 |
| 6,339,134 B1 | 1/2002 | Crowther et al. ........... 526/128 |
| 6,340,730 B1 | 1/2002 | Murray et al. .............. 526/114 |
| 6,346,586 B1 | 2/2002 | Agapiou et al. ............ 526/160 |
| 6,380,328 B1 | 4/2002 | McConville et al. ....... 526/119 |
| 6,420,580 B1 | 7/2002 | Holtcamp et al. ............ 556/11 |
| 6,515,086 B1 * | 2/2003 | Razavi ....................... 526/160 |
| 6,605,675 B2 * | 8/2003 | Mawson et al. ............ 526/115 |
| 6,753,390 B2 * | 6/2004 | Ehrman et al. ............. 526/113 |
| 6,777,366 B2 | 8/2004 | Gauthier et al. ............ 502/117 |
| 6,777,367 B2 | 8/2004 | Gauthier et al. ............ 502/117 |
| 6,855,783 B2 * | 2/2005 | Gauthier et al. ............ 526/160 |
| 2005/0148460 A1 * | 7/2005 | Marin et al. ................ 502/152 |

FOREIGN PATENT DOCUMENTS

| | | |
|---|---|---|
| EP | 0634421 | 1/1995 |
| EP | 0794200 | 9/1997 |
| EP | 802 202 | 10/1997 |
| WO | WO9807515 | 2/1998 |
| WO | WO9832775 | 7/1998 |

* cited by examiner

*Primary Examiner*—David W. Wu
*Assistant Examiner*—Rip A. Lee
(74) *Attorney, Agent, or Firm*—Tenley R. Krueger

(57) ABSTRACT

A process for preparing low melting copolymers comprising contacting a mixture of olefin monomers with a CpFlu-type metallocene catalyst under reaction conditions sufficient to form a copolymer. The copolymers thus prepared desirably display melt temperatures from about 100° C. to about 140° C. and may be produced with reduced amounts of ethylene. The copolymers may also exhibit reduced levels of undesirable xylene solubles, relatively narrow molecular weight distribution, and other improved optical and physical properties.

24 Claims, No Drawings

PROCESS FOR INCREASING ETHYLENE INCORPORATION INTO RANDOM COPOLYMERS

BACKGROUND OF THE INVENTION

1. Technical Field

This invention relates to olefinic polymers. More particularly, it relates to a process for the preparation of olefinic copolymers using metallocene catalysts.

2. Background of the Art

Over the last several years it has been shown by a number of researchers that use of metallocene catalysts offer improvements in polymer properties when compared with production of similar polymers using Ziegler-Natta catalysts. For example, metallocene catalyzed polyolefins typically have lower xylene solubles than Ziegler-Natta catalyzed polymers. At least some of the improvements are attributable to the increased control of stereochemistry, molecular mass and comonomer incorporation obtainable with the metallocenes. This control enables tailoring of the final polymer and may offer improvements in areas as diverse as optical performance, strength performance, aging and the like.

For many applications, including films, fibers and injection molded articles, copolymers including a proportion of ethylene have been found to be both useful and economical. Because of this, a variety of such copolymers have been identified as exhibiting improved properties when prepared with certain metallocene catalysts. The incorporation of ethylene into these materials has been problematic, however. This is, in part, because ethylene incorporation may frequently occur in a percentage that is less than the percentage of ethylene in the feedstock. However, higher levels of ethylene incorporation offer the benefit of reducing the melt temperature of the final copolymer, which leads some manufacturers to employ proportionately larger amounts of ethylene in the feedstock. Unfortunately, this approach is not always trouble free and may cause undesirable effects, such as, for example, excessive venting or circulation problems, which may make it difficult to control the polymerization process. Use of relatively large amounts of ethylene in the feedstock may also detrimentally affect the quality of the copolymer being produced. For example, in some cases it may increase the production of xylene solubles. When this occurs, the copolymer's performance in its ultimate application, such as a film, may be unacceptable.

Thus, what is needed is a process for preparing copolymers with the ability to produce low melting metallocene random copolymers without the use of excessively high ethylene concentration.

SUMMARY OF THE INVENTION

In one aspect, the invention is a process for preparing random copolymers including polymerizing a mixture of monomers including at least propylene and ethylene monomer, in the presence of a catalyst system including a metallocene catalyst having the general structure:

$$X(CpR^1R^2)(FluR^3{}_2)MQ_2$$

wherein Cp is a cyclopentadienyl ring; Flu is a fluorenyl ring; X is a structural bridge imparting stereorigidity; $R^1$ is optionally a substituent on the cyclopentadienyl ring which is distal to the bridge, and which distal substituent comprises a bulky group of the formula $R^4R^5{}_3$ in which $R^4$ is chosen from Group IVA, and each $R^5$ is the same or different and is a hydrogen or a hydrocarbyl of from 1 to 20 carbon atoms; $R^2$ is optionally a substituent on the cyclopentadienyl ring which is proximal to the bridge and positioned non-vicinal to the distal substituent and is of the formula $R^6R^7{}_3$ in which $R^6$ is chosen from group IVA, and each $R^7$ is the same or different and chosen from hydrogen or hydrocarbyl of 1 to 7 carbon atoms; each $R^3$ is the same or different and is a hydrogen or a hydrocarbyl having from 1 to 20 carbon atoms with one $R^3$ being substituted at a non-proximal position on the fluorenyl group and the other $R^3$ being substituted at an opposed non-proximal position on the fluorenyl group; M is a Group IVB transition metal or vanadium; and each Q is and hydrogen or a hydrocarbyl having 1 to 20 carbon atoms or a halogen; wherein ethylene is incorporated into the copolymer at a weight ratio of ethylene incorporated to ethylene in the feed of from about 4 to about 15.

In another aspect, the invention is an article of manufacture comprising a film, fiber, or injection molded article prepared using a copolymer prepared using a process for preparing random copolymers, the process including polymerizing a mixture of monomers including at least propylene and ethylene monomer, in the presence of a catalyst system including a metallocene catalyst having the general structure:

$$X(CpR^1R^2)(FluR^3{}_2)MQ_2$$

wherein Cp is a cyclopentadienyl ring; Flu is a fluorenyl ring; X is a structural bridge imparting stereorigidity; $R^1$ is optionally a substituent on the cyclopentadienyl ring which is distal to the bridge, and which distal substituent comprises a bulky group of the formula $R^4R^5{}_3$ in which $R^4$ is chosen from Group IVA, and each $R^5$ is the same or different and is a hydrogen or a hydrocarbyl of from 1 to 20 carbon atoms; $R^2$ is optionally a substituent on the cyclopentadienyl ring which is proximal to the bridge and positioned non-vicinal to the distal substituent and is of the formula $R^6R^7{}_3$ in which $R^6$ is chosen from group IVA, and each $R^7$ is the same or different and chosen from hydrogen or hydrocarbyl of 1 to 7 carbon atoms; each $R^3$ is the same or different and is a hydrogen or a hydrocarbyl having from 1 to 20 carbon atoms with one $R^3$ being substituted at a non-proximal position on the fluorenyl group and the other $R^3$ being substituted at an opposed non-proximal position on the fluorenyl group; M is a Group IVB transition metal or vanadium; and each Q is and hydrogen or a hydrocarbyl having 1 to 20 carbon atoms or a halogen; wherein ethylene is incorporated into the copolymer at a weight ratio of ethylene incorporated to ethylene in the feed of from about 4 to about 15.

DETAILED DESCRIPTION OF THE INVENTION

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are shown below. To the extent a term used in a claim is not defined below, it should be given the broadest definition persons in the pertinent art have given that term as reflected in printed publications and issued patents.

The invention provides a simple and convenient means of preparing olefinic copolymers using a metallocene catalyst or catalysts selected from the CpFlu family. These metallocene catalysts have a general structure represented by the general formula:

$$X(CpR^1R^2)(FluR^3{}_2)MQ_2$$

wherein wherein Cp is a cyclopentadienyl ring; Flu is a fluorenyl ring; X is a structural bridge imparting stereorigidity; $R^1$ is optionally a substituent on the cyclopentadienyl ring which is distal to the bridge, and which distal substituent comprises a bulky group of the formula $R^4R^5{}_3$ in which $R^4$ is chosen from Group IVA, and each $R^5$ is the same or different and is a hydrogen or a hydrocarbyl of from 1 to 20 carbon atoms; $R^2$ is optionally a substituent on the cyclopentadienyl ring which is proximal to the bridge and positioned non-vicinal to the distal substituent and is of the formula $R^6R^7{}_3$ in which $R^6$ is chosen from group IVA, and each $R^7$ is the same or different and chosen from hydrogen or hydrocarbyl of 1 to 7 carbon atoms; each $R^3$ is the same or different and is a hydrogen or a hydrocarbyl having from 1 to 20 carbon atoms with one $R^3$ being substituted at a non-proximal position on the fluorenyl group and the other $R^3$ being substituted at an opposed non-proximal position on the fluorenyl group; M is a Group IVB transition metal or vanadium; and each Q is and hydrogen or a hydrocarbyl having 1 to 20 carbon atoms or a halogen. A hydrocarbyl is any group including hydrogen and carbon and may also include other atoms including but not limed to Cl, Br, I, S, N, P, and mixtures thereof.

Metallocene catalysts may be characterized generally as coordination compounds incorporating one or more cyclopentadienyl (Cp) groups (which may be substituted or unsubstituted, each substitution being the same or different) coordinated with a transition metal through n bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

$$[L]_mM[A]_n$$

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment, is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group typically includes ring fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls, optionally containing halogens such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. In catalysts where there are two L groups, they may be bridged to each other. A bridged metallocene, for example may, be described by the general formula:

$$XCp^ACp^BMA_n$$

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, —$Si(R)_2Si(R_2)$—, $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl. The bridging groups may also have carbons or silicons having an olefinic substituent.

In another exemplary catalyst, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The metallocene catalysts also includes the CpFlu family of catalysts (e.g., a metallocene incorporating a substituted Cp fluorenyl ligand structure) represented by the following formula:

$$X(CpR^1_nR^2_m)(Flu^3_p)$$

wherein Cp is a cyclopentadienyl group, Fl is a fluorenyl group, X is a structural bridge between Cp and Fl, $R^1$ is a substituent on the Cp, n is 1 or 2, $R^2$ is a substituent on the Cp at a position which is proximal to the bridge, m is 1 or 2, each $R^3$ is the same or different and is a hydrogen or a hydrocarbyl group having from 1 to 20 carbon atoms with $R^3$ being substituted on a nonproximal position on the fluorenyl group and at least one other $R^3$ being substituted at an opposed nonproximal position on the fluorenyl group and p is 2 or 4.

Another family of the metallocene catalyst includes bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. Nos. 6,069,213, 5,026,798, 5,703,187, and 5,747,406, including a dimer or oligomeric structure, such as disclosed in, for example, U.S. Pat. Nos. 5,026,798 and 6,069,213, which are incorporated by reference herein.

Non-limiting examples of metallocene catalyst components include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
mesoethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyi)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecyclcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyl)zirconium$A_n$,
bistrimethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyi)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$, bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
n(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitanium$A_n$,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methyl phenylsilyltetramethylcyclopentad ienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$,
methylphenylsilyltetramethylcyclopentadienylcyclooctylamidotitanium$A_n$,
methylphenylsilyltetramethylcyclopentadienylcyclononylamidotitanium$A_n$,
methylphenylsilyltetramethylcyclopentadienylcyclodecylamidotitanium$A_n$,
methylphenylsilyltetramethylcyclopentadienylcycloundecylamidotitanium$A_n$,
methylphenylsilyltetramethylcyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titanium$A_n$,
methylphenylsilyl(tetramethylcyclopentadienyl)(n-decylamido)titanium$A_n$,
methylphenylsilyl(tetramethylcyclopentadienyl)(n-octadecylamido)titanium$A_n$,
diphenylsilyltetramethylcyclopentadienylcyclopropylamidotitanium$A_n$,
diphenylsilyltetramethylcyclopentadienylcyclobutylamidotitanium$A_n$,
diphenylsilyltetramethylcyclopentadienylcyclopentylamidotitanium$A_n$,
diphenylsilyltetramethylcyclopentadienylcyclohexylamidotitanium$A_n$,
diphenylsilyltetramethylcyclopentadienylcycloheptylamidotitanium$A_n$,
diphenylsilyltetramethylcyclopentadienylcyclooctylamidotitanium$A_n$,
diphenylsilyltetramethylcyclopentadienylcyclononylamidotitanium$A_n$,
diphenylsilyltetramethylcyclopentadienylcyclodecylamidotitanium$A_n$,
diphenylsilyltetramethylcyclopentadienylcycloundecylamidotitanium$A_n$,
diphenylsilyltetramethylcyclopentadienylcyclododecylamidotitanium$A_n$,
diphenylsilyl(tetramethylcyclopentadienyl)(sec-butylamido)titanium$A_n$,
diphenylsilyl(tetramethylcyclopentadienyl)(n-octylamido)titanium$A_n$,
diphenylsilyl(tetramethylcyclopentadienyl)(n-decylamido)titanium$A_n$,
diphenylsilyl(tetramethylcyclopentadienyl)(n-octadecylamido)titanium$A_n$, and derivatives thereof.

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as the aluminoxanes as activators. Aluminoxanes are well known in the art and can be made by conventional methods, such as, for example admixing an aluminum alkyl with water. Nonhydrolytic routes to form these materials are also known Traditionally, the most widely used aluminoxane is methylaluminoxane (MAO), an aluminoxane compound in which the alkyl groups are methyls. Aluminoxanes with higher alkyl groups include hexaisobutylalumoxane (HIBAO) isobutylaluminoxane, ethylaluminoxane, butylaluminoxane, heptylaluminoxane and methylbutylaluminoxane; and combinations thereof. Modified aluminoxanes (e.g., "MMAO"), may olso be used. The use of MAO and other aluminum-based activators in polyolefin polymerizations as activators are well known in the art.

Ionizing activators are well known in the art and are described by, for example, *Eugene You-Xian Chen & Tobin J. Marks, Cocatalysts for Metal-Catalyzed Olefin Polymerization: Activators, Activation Processes, and Structure-Activity Relationships* 100(4) CHEMICAL REVIEWS 1391–1434 (2000). Examples of neutral ionizing activators include Group 13 tri-substituted compounds, in particular, tri-substituted boron, tellurium, aluminum, gallium and indium compounds, and mixtures thereof (e.g., tri(n-butyl) ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

Illustrative, not limiting examples of ionic ionizing activators include trialkyl-substituted ammonium salts such as:
triethylammoniumtetraphenylboron,
tripropylammoniumtetraphenylboron,
tri(n-butyl)ammoniumtetraphenylboron,
trimethylammoniumtetra(p-tolyl)boron,
trimethylammoniumtetra(o-tolyl)boron,
tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-tri-fluoromethylphenyl)boron,
tributylammoniumtetra(pentafluorophenyl)boron,
tri(n-butyl)ammoniumtetra(o-tolyl)boron, and the like;
N,N-dialkylanilinium salts such as:
N,N-dimethylaniliniumtetraphenylboron,
N,N-diethylaniliniumtetraphenylboron,
N,N-2,4,6-pentamethylaniliniumtetraphenylboron and the like;
dialkyl ammonium salts such as:
diisopropylammoniumtetrapentafluorophenylboron,
dicyclohexylammoniumtetraphenylboron and the like;
triaryl phosphonium salts such as:
triphenylphosphoniumtetraphenylboron,
trimethylphenylphosphoniumtetraphenylboron,
tridimethylphenylphosphoniumtetraphenylboron, and the like, and their aluminum equivalents.

In yet another embodiment, an alkylaluminum may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

Other activators include those described in WO 98/07515 such as tris (2, 2',2"-nonafluorobiphenyl) fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate)-4T-HF; silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in for example, U.S. Pat. Nos. 5,849,852 5,859,653 and 5,869,723; and WO 98/32775.

In general, the activator and catalyst component(s) are combined in mole ratios of activator to catalyst component from 1000:1 to 0.1:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (e.g., Al from MAO:Zr from metallocene) ranges from 40 to 500 in one embodiment, ranges from 50 to 400 in another embodiment, ranges from 60 to 300 in yet another embodiment, ranges from 70 to 200 in yet another embodiment, ranges from 80 to 175 in yet another embodiment; and ranges from 90 to 125 in yet another embodiment, wherein a desirable molar ratio of Al(MAO) to metallocene-metal "M" may be any combination of any upper limit with any lower limit described herein.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

In one embodiment, the heterocyclic compound described above is combined with an alkyl aluminum scavenger. The alkyl aluminum compounds can remove or mitigate materials such as water and oxygen that could otherwise interfere with the metallocene catalysts. Non-limiting examples of alkylaluminums include trimethylaluminum, triethylaluminum (TEAL), triisobutylaluminum (TIBAL), tri-n-hexylaluminum, tri-n-octylaluminum, tri-iso-octylaluminum, triphenylaluminum, and combinations thereof. While most often used as scavengers, the compounds can also, in some applications, function as cocatalysts or activators also. One of ordinary skilled in the art of performing metallocene catalyzed polyolefin polymerizations will be versed in selecting and employing such scavengers.

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 m$^2$/g to 1,000 m$^2$/g, or from 100 m$^2$/g to 400 m$^2$/g, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, desirably the NCA is first added to the support composition followed by the addition of the metallocene catalyst. In some processes, when the activator is MAO, the MAO and metallocene catalyst may be dissolved together in solution. The support is then contacted with the MAO/metallocene catalyst solution. In another embodiment of the process, MAO is first reacted with silica and then a metallocene is added to prepare a catalyst. Other methods and order of addition will be apparent to those skilled in the art. Such processes are known in the art and disclosed in, for example, U.S. Pat. Nos. 6,777,366 and 6,777,367, both to Gauthier, et al., and incorporated herein by reference.

To prepare a copolymer it is necessary, in general, to contact the mixture of monomers and the given catalyst. In most cases it is desirable that the catalyst has been preactivated. Those skilled in the art will understand that this refers to subjecting the metallocene catalyst to conditions that promote the desired interaction between the activator or co-catalyst and the metallocene. The most commonly employed method of activating a catalyst is simply heating it to a sufficient temperature and for a sufficient time, determined as a matter of routine experimentation. This is discussed further in, for example, U.S. Pat. No. 6,180,732, the disclosure of which is incorporated herein by reference. Other methods can be used. For example, in another embodiment, MAO may be reacted with a support at a comparatively high temperature and a lower temperature used for metallocene impregnation.

Those skilled in the art will appreciate that modifications in the above generalized preparation method may be made without altering the outcome. Therefore, it will be understood that additional description of methods and means of preparing the catalyst are outside of the scope of the invention, and that it is only the identification of the prepared catalysts, as defined herein, that is necessarily described herein.

The inventive process comprises polymerizing monomers using CpFlu metallocenes. These metallocene catalysts have a structure represented by the general formula:

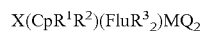

$$X(CpR^1R^2)(FluR^3{}_2)MQ_2$$

wherein wherein Cp is a cyclopentadienyl ring; Flu is a fluorenyl ring; X is a structural bridge imparting stereorigidity; $R^1$ is optionally a substituent on the cyclopentadienyl ring which is distal to the bridge, and which distal substituent comprises a bulky group of the formula $R^4R^5{}_3$ in which $R^4$ is chosen from Group IVA, and each $R^5$ is the same or different and is a hydrogen or a hydrocarbyl of from 1 to 20 carbon atoms; $R^2$ is optionally a substituent on the cyclopentadienyl ring which is proximal to the bridge and positioned non-vicinal to the distal substituent and is of the formula $R^6R^7{}_3$ in which $R^6$ is chosen from group IVA, and each $R^7$ is the same or different and chosen from hydrogen or hydrocarbyl of 1 to 7 carbon atoms; each $R^3$ is the same or different and is a hydrogen or a hydrocarbyl having from 1 to 20 carbon atoms with one $R^3$ being substituted at a non-proximal position on the fluorenyl group and the other $R^3$ being substituted at an opposed non-proximal position on the fluorenyl group; M is a Group IVB transition metal or vanadium; and each Q is and hydrogen or a hydrocarbyl having 1 to 20 carbon atoms or a halogen.

The metallocene catalysts described herein are used to make copolymers and terpolymers using monomers including polypropylene and polyethylene. A variety of processes can be carried out to prepare the polymers. Among the varying approaches that can be used include procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes discussed in any of the following patents can be used, each of which is incorporated by reference: U.S. Pat. Nos. 6,420,580 6,380,328 6,359,072 6,346,586 6,340,730 6,339, 134 6,300,436 6,274,684 6,271,323 6,248,845 6,245,868 6,245,705 6,242,545 6,211,105 6,207,606 6,180,735 and 6,147,173.

The catalysts and catalyst systems can be used over a wide range of temperatures and pressures. The temperatures may be in the range of from about −60° C. to about 280° C., or from about 50° C. to about 200° C. and the pressures employed may be in the range of from 1 atmosphere to about 500 atmospheres or higher. Such polymerization processes include solution, bulk, gas phase, slurry phase, high pressure processes or a combination thereof.

Examples of solution processes are described in U.S. Pat. Nos. 4,271,060 5,001,205 5,236,998 and 5,589,555.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See, for example, U.S. Pat. Nos. 4,543,399 4,588,790 5,028,670 5,317,036 5,352,749 5,405,922 5,436,304 5,456,471 5,462,999 5,616,661 and 5,668,228.

The reactor pressure in a gas phase process may vary from about 100 psig to about 500 psig, or from about 200 to about 400 psig, or from about 250 to about 350 psig. The reactor temperature in a gas phase process may vary from 30° C. to 120° C. or 60° C. to 115° C. or 70° C. to 110° C. or 70° C. to 95° C.

Other gas phase processes contemplated by the process includes those described in U.S. Pat. Nos. 5,627,242 5,665,818 and 5,677,375 and European publications EP-A-0 794 200 EP-A-0 802 202 and EP-B-634 421.

Slurry processes generally include forming a suspension of solid, particulate polymer in a liquid polymerization medium, to which monomers and optionally hydrogen, along with catalyst, are added. The suspension (which may include diluents) can be intermittently or continuously removed from the reactor where the volatile components can be separated from the polymer and recycled, optionally after a distillation, to the reactor. The liquefied diluent employed in the polymerization medium is typically an alkane having from 3 to 7 carbon atoms, preferably a branched alkane. The medium employed should be liquid under the conditions of polymerization and relatively inert, such as hexane or isobutane.

In a specific embodiment, the process is a bulk process. A bulk process is very similar to a slurry process except that no non-reactive diluent is purposefully added to the reaction medium. Instead, the major monomer, such as propylene is used as the liquid portion of the reaction medium. It should be noted, however, that residual amounts of alkanes may be present in the reaction medium due to the level of alkane present in the alkene monomers used in the reaction. The polymerization may be carried out continuously in one or more loop reactors. In another embodiment, the polymerization is performed in a continuously stirred reactor also known as CSTR reactors.

The catalyst as a slurry or as a dry free flowing powder can be injected regularly to the reactor loop, which can itself be filled with circulating slurry of growing polymer particles in a monomer. Hydrogen, optionally, may be added as a molecular weight control. The reactor may be maintained at a pressure of from about 27 bar to about 45 bar and a temperature of from about 38° C. to about 121° C. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of unreacted monomer and comonomers. The resulted hydrocarbon free powder can then be compounded for use in various applications. Alternatively, other types of slurry polymerization processes can be used, such stirred reactors is series, parallel or combinations thereof.

A slurry and/or polymerization process generally includes pressures in the range of 1 to 50 atmospheres and even greater and temperatures of from about 0° C. to about 120° C.

A solution process can also be used. Examples of solution processes are described in U.S. Pat. Nos. 4,271,060 5,001,205 5,236,998 and 5,589,555.

Selection of monomers to prepare the copolymers will be within the skill of those in the art. The copolymers of the invention will, in most embodiments include propylene as the monomer present in excess of the other co-monomers and ethylene and may generally include other olefins such as butylene, isobutylene, octene, hexene, styrene, and the like. The invention is useful for preparing copolymers and other multi-monomer polymers such as terpolymers. Such may include propylene-ethylene, propylene-ethylene-butylene, propylene-ethylene-octene, propylene-ethylene-hexene and the like. Other terpolymers include those referred to as ethylene propylene diene monomer (EPDM) resins prepared using propylene, ethylene and one or more of group consisting of dicyclopentadiene (DCPD), ethylidene norbornene (ENB) or 1,4 hexadiene; 5-vinylnorbornene and mixtures thereof. The EPDM resins can be prepared using a diene having a terminal and an internal unsaturation.

Ethylene may be incorporated into the copolymer at from about 0.1 to about 15 percent by weight of the copolymer. In other embodiments, it is incorporated at from about 1 to about 10 percent by weight, and in still other embodiments, from about 3 to about 7 percent by weight. In one embodiment, sufficient ethylene is incorporated such that the resulting copolymer is semi crystalline.

In a batch process, ethylene is generally incorporated into a copolymer at a level that is the same or nearly the same as the concentration of ethylene present in the feed. For example, to achieve an incorporation of 5 weight percent ethylene into copolymer in a conventional process, it is necessary to use an ethylene feed of about 5 weight percent, enough to cause processing problems in some reactor systems. Use of the subject CpFlu catalysts can allow for the incorporation of from about 4 to about 15 times that amount wherein a feed having an ethylene content of about 1 weight percent can be used to produce a copolymer having an ethylene content of from about 4 to 15 weight percent. In another embodiment, the ratio of ethylene incorporation to ethylene feed concentration is from about 6 to about 12. In still another embodiment, the ratio is from about 8 to about 10.

In a continuous process, such as a slurry process in a loop or double loop reactor, the CpFlu catalyst can usually incorporate all or nealy all of the ethylene fed into the reactor into a copolymer. This can be desirable where the recycle of ethylene is inconvenient or the cause of process problems. In some embodiment, the conversion may be as low as 60 percent.

The copolymers produced using the process may exhibit some particularly desirable physical properties. These properties may contribute to improved processability and/or to improved performance in their ultimate applications. For example, melt temperature of the final copolymer is relatively low. As used herein, "low melting copolymer" refers to a copolymer having a melt temperature ($T_m$) of from about 100° C. to about 140° C. In alternative embodiments the $T_m$ is from about 100° C. to about 130° C., and in other embodiments the $T_m$ is from about 110° C. to about 125° C. The $T_m$ is determined using a differential scanning calorimeter.

The xylene solubles content of the final copolymer is important in determining its performance for certain applications. This is particularly true for films, fibers and injection molded articles. In these and other applications, significant levels of xylene solubles tend to result in migration that produces surface residue or otherwise affects optical properties such as clarity. In some embodiments the xylene solubles content of the copolymers produced in the inventive process may be less than about 10 percent by weight of the copolymer. In other embodiments the xylene solubles may be less than about 5 percent by weight. Reduced levels of xylene solubles also tend to reduce undesirable "stickiness" in the copolymer pellets or fluff, which may impede processing.

For certain applications it is desirable to employ a copolymer having a relatively narrow molecular weight distribution (MWD). The MWD is defined as the weight average molecular weight divided by the number average molecular weight (Mw/Mn). Polymers having relatively narrow MWD's are particularly useful for films, fibers and injection molded articles because the melt flows are better, so the polymer may be drawn more easily into thinner fibers, or more easily cast into films and flowed into injection molded parts. The inventive process produces copolymers that may, in some embodiments, exhibit MWD's of less than about 3 polydisperity units, and in other embodiments such MWD's may be from about 2.0 to about 2.5 polydisperity units.

While the MWD may be controlled in any way known to be useful to those of ordinary skill in the art, in one embodiment, the MWD of a propylene-ethylene copolymer is controlled using a double loop reactor. In this process, hydrogen is added in low concentration in the first loop and higher concentration in the second loop. In such a process, the MWD may range from 2 to 20.

While the identified metallocene catalysts may be useful for preparing copolymers in general, it has been found that they are particularly efficacious for preparing copolymers having a melt temperature desirably from about 100° C. to about 140° C., more desirably from about 100° C. to about 130° C., and most desirably from about 110° C. to about 125° C. All such copolymers are defined herein as low melting copolymers. These copolymers offer particular advantages in a wide variety of applications because of their improved optical and physical properties, as well as their organoleptic properties, i.e., their resistance to transfer of taste and/or odor, which makes them particularly desirable for food-related applications such as food packaging. Melt flow rates of from about 16 to about 21 g/10 min may be obtained for certain inventive propylene-ethylene copolymers, which indicates good processability using a 2.16 kg load according to ASTM D1238-65T. Aging performance is also often improved, as compared to that of copolymers prepared using other catalysts.

The copolymers prepared using the process are or at least have isotactic regions in the polymers. Olefins having 3 or more carbon atoms can be polymerized to produce a polymer with an isotactic stereochemical configuration. For example, in the polymerization of propylene to form polypropylene, the isotactic structure is typically described as having methyl groups attached to the tertiary carbon atoms of successive monomeric units on the same side of a hypothetical plane through the main chain of the polymer. This can be described using the Fischer projection formula as follows:

Another way of describing the structure is through the use of NMR spectroscopy. Bovey's NMR nomenclature for an isotactic pentad is . . . mmmm with each "m" representing a "meso" diad or successive methyl groups on the same side in the plane In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is described as follows:

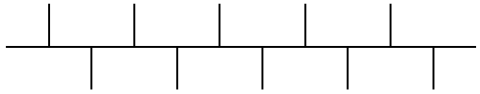

In NMR nomenclature, a syndiotactic pentad is described as . . . rrrr . . . in which "r" represents a "racemic" diad with successive methyl groups on alternate sides of the plane.

In contrast to isotactic and syndiotactic polymers, an atactic polymer exhibits no regular order of repeating unit. Unlike syndiotactic or isotactic polymers, an atactic polymer is not crystalline and forms essentially a waxy product.

Generally, the polymers produced as disclosed herein and blends thereof may be useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes and pond liners. Molded articles include single and multi-layered constructions in the form of bottles, tanks, large hollow articles, rigid food containers, toys, and the like.

The following examples are provided to more fully illustrate the invention. As such, they are intended to be merely illustrative and should not be construed as being limitative of the scope of the invention in any way. Those skilled in the art will appreciate that modifications may be made to the invention as described without altering its scope. For example, selection of particular monomers or combinations of monomers; and modifications such as of catalyst concentration, feed rate, processing temperatures, pressures and other conditions, and the like, not explicitly mentioned herein but falling within the general description hereof, will still fall within the intended scope of both the specification and claims appended hereto.

EXAMPLES

Example 1

An experiment is run to determine the effect of using a substituted isospecific CpFlu-type catalyst on ethylene incorporation levels to produce a copolymer of a given melting temperature. In this experiment the substituted isospecific CpFlu-type catalyst is $Me_2C(2\text{-}Me\text{-}4\text{-}tBuCp)FluZrCl_2$. The metallocene loading is about 2 percent based on weight of the catalyst solution as whole. Identical conditions of time, temperature, and other relevant polymerization variables are consistent for each run. Measurements are taken of the weight percent of ethylene in the feed and in the copolymer, the melt temperature ($T_m$) of the final copolymer, the levels of crystallinity (% crystal) and xylene solubles, molecular weight, and molecular weight distribution (MWD), as shown in Table 1.

TABLE 1

| Run | Ethylene wt % in feed | Ethylene wt % in copolymer by FTIR | $T_m$ (° C.) | % Crystal* | Xylene Solubles wt % | Mw × 1000 | MWD (polydisperity units) |
|---|---|---|---|---|---|---|---|
| 1** | 0 | 0 | 143 | 37 | 0.3 | 181 | 2.5 |
| 2 | 0.4 | 2.5 | 127 | 28 | 0.6 | 96 | 2.3 |
| 3 | 0.8 | 4.6 | 115 | 17 | 0.6 | 120 | 2.2 |
| 4 | 1.0 | 5.5 | 110 | 13 | 0.9 | 105 | 2.2 |
| 5 | 1.3 | 5.4 (NMR) | 104 | 17 | 11 | — | — |

*% Crystal measured as heat of fusion by DSC/209 J/g
**not an example of the invention (not a copolymer)

The results indicate that the inventive copolymer produced by the inventive process is surprisingly enriched in ethylene compared to the feed composition. This shows that the invention avoids the process problems that may occur in conventional processes when relatively greater amounts of ethylene are employed to achieve comparable levels of ethylene incorporation.

Example 2

Another experiment is carried out to prepare propylene-ethylene copolymer fluff for analytical characterization. Reaction conditions are those employed in Example 1. Characterizations of samples taken at three different points in the run (labeled as samples 6–8) are shown in Table 2.

TABLE 2

| Characteristic | Sample 6 | Sample 7 | Sample 8 |
|---|---|---|---|
| $T_m$ | 128.4 | 128.4 | 121.7 |
| MWD (polydisperity units) | 2.3 | 2.3 | 2.2 |
| MF (g/10 min) | 16 | 17 | 19.5 |
| Ethylene wt % by NMR | 1.1 | 1.4 | 2.1 |
| Xylene Solubles wt % | 0.2 | 0.3 | 0.4 |

This experiment shows that xylene solubles levels are impressively low despite the relatively low overall melt temperature of the run, which would predict good optics properties in particular. It also shows that MWD is relatively narrow.

Comparative Example 3

A non-CpFlu catalyst is used to demonstrate conventional feed ethylene incorporation rates. The catalyst used for the comparative process is a racemic-$Me_2Si(2Me\text{-}4\text{-}PhInd)_2ZrCl_2$ on 0.7/1MAO on P10 silica with a 2 percent loading. Ethylene and hydrogen are batched into a reactor at the start of run. Polymerization is carried out in a 4-liter reactor using 1.3 kg propylene, and 15 mg of the catalyst A. 90 mg triethylaluminum (TEAl) is used as a scavenger. Reaction conditions for all runs included a temperature of 60° C. and a polymerization time of about 30 minutes. Results are summarized in Table 3.

TABLE 3

| | Sample | | | | | |
|---|---|---|---|---|---|---|
| | 1 | 2 | 3 | 4 | 5 | 6 |
| [E] Wt % in feed | 1.0 | 1.6 | 2.5 | 3.0 | 3.4 | 6.0 |
| [E] Wt % in copolymer* | — | 1.8 | 2.6 | 3.0 | 3.3 | 6.0 |

[E] is ethylene.

What is claimed is:

1. A process for preparing random copolymers comprising polymerizing a mixture of monomers comprising propylene and ethylene monomer in a loop reactor to form a random copolymer, in the presence of a catalyst system comprising a metallocene catalyst having the general structure:

$$X(CpR^1R^2)(FluR^3{}_2)MQ_2$$

wherein Cp is a cyclopentadienyl ring; Flu is a fluorenyl ring; X is a structural bridge imparting stereorigidity; $R^1$ is a substituent on the cyclopentadienyl ring which is distal to the bridge, and which distal substituent comprises a bulky group of the formula $R^4R^5{}_3$ in which $R^4$ is chosen from Group IVA, and each $R^5$ is the same or different and is a hydrogen or a hydrocarbyl of from 1 to 20 carbon atoms; $R^2$ is a substituent on the cyclopentadienyl ring which is proximal to the bridge and positioned non-vicinal to the distal substituent and is of the formula $R^6R^7{}_3$ in which $R^6$ is chosen from group IVA, and each $R^7$ is the same or different and chosen from hydrogen or hydrocarbyl of 1 to 7 carbon atoms; each $R^3$ is the same or different and is a hydrogen or a hydrocarbyl having from 1 to 20 carbon atoms with one $R^3$ being substituted at a position selected from 2, 3 or 4 on the fluorenyl group and the other $R^3$ being substituted at a position selected from 5, 6 or 7 on the fluorenyl group; M is a Group IVB transition metal or vanadium; and each Q is and hydrogen or a hydrocarbyl having 1 to 20 carbon atoms or a halogen, wherein the process exhibits a ratio of ethylene incorporation to ethylene feed concentration of from about 4:1 to about 15:1.

2. The process of claim 1, wherein the catalyst system includes an activator.

3. The process of claim 2 wherein the activator is methylaluminoxane (MAO).

4. The process of claim 1, wherein the metallocene catalyst is supported.

5. The process of claim 4 wherein the catalyst is supported on a MAO-silica support.

6. The process of claim 1, wherein the catalyst system has been dispersed in a diluent to form a dispersion prior to contacting the catalyst system with the monomers.

7. The process of claim 6 wherein the dispersion has a metallocene loading of from about 0.5 to about 6 percent by weight of the catalyst solids.

8. The process of claim 7 wherein the dispersion has a metallocene loading of from about 0.5 to about 3 percent by weight.

9. The process of claim 6 wherein the diluent is mineral oil.

10. The process of claim 1, additionally comprising using a scavenger.

11. The process of claim 10 wherein the catalyst is a an alkyl aluminum selected from the group consisting of TEAL, TIBAL, and mixtures thereof.

12. The process of claim 1, wherein the ethylene is incorporated into the copolymer in an amount of from about 0.1 to about 15 percent by weight of the copolymer.

13. The process of claim 12 wherein the ethylene is incorporated in the copolymer in an amount from about 1 to about 10 percent by weight of the copolymer.

14. The process of claim 13 wherein the ethylene is incorporated in the copolymer in an amount from about 3 to about 7 percent by weight of the copolymer.

15. The process of claim 1, further comprising a hydrogen feed.

16. The process of claim 1, wherein the copolymer exhibits a xylene solubles content of less than about 10 percent by weight of the copolymer.

17. The process of claim 1, wherein the copolymer exhibits a melt temperature from about 100° C. to about 140° C.

18. The process of claim 17 wherein the copolymer exhibits a melt temperature from about 110 to about 125° C.

19. The process of claim 1, wherein the process is a bulk slurry process.

20. The process of claim 1, wherein the polymerizing of the monomers is done in a double loop reactor.

21. The process of claim 1, wherein the copolymer exhibits a MWD of 2 to 20.

22. An article of manufacture comprising a film, fiber, or injection molded article prepared using a copolymer prepared using the process of claim 1.

23. A process for preparing random copolymers comprising polymerizing a mixture of monomers comprising propylene, ethylene and at least one monomer selected from butylene, isobutylene, octene, hexene, styrene, dicyclopentadiene (DCPD), ethylidene norbornene (ENB) or 1,4-hexadiene, 5-vinylnorbornene and mixtures thereof to form a random copolymer, in the presence of a catalyst system comprising a metallocene catalyst having the general structure:

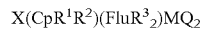

$$X(CpR^1R^2)(FluR^3_2)MQ_2$$

wherein Cp is a cyclopentadienyl ring; Flu is a fluorenyl ring; X is a structural bridge imparting stereorigidity; $R^1$ is a substituent on the cyclopentadienyl ring which is distal to the bridge, and which distal substituent comprises a bulky group of the formula $R^4R^5_3$ in which $R^4$ is chosen from Group IVA, and each $R^5$ is the same or different and is a hydrogen or a hydrocarbyl of from 1 to 20 carbon atoms; $R^2$ is a substituent on the cyclopentadienyl ring which is proximal to the bridge and positioned non-vicinal to the distal substituent and is of the formula $R^6R^7_3$ in which $R^6$ is chosen from group IVA, and each $R^7$ is the same or different and chosen from hydrogen or hydrocarbyl of 1 to 7 carbon atoms; each $R^3$ is the same or different and is a hydrogen or a hydrocarbyl having from 1 to 20 carbon atoms with one $R^3$ being substituted at a position selected from 2, 3 or 4 on the fluorenyl group and the other $R^3$ being substituted at a position selected from 5, 6 or 7 on the fluorenyl group; M is a Group IVB transition metal or vanadium; and each Q is and hydrogen or a hydrocarbyl having 1 to 20 carbon atoms or a halogen, wherein the process exhibits a ratio of ethylene incorporation to ethylene feed concentration of from about 4:1 to about 15:1.

24. A process for preparing random copolymers comprising:

polymerizing a mixture of monomers comprising propylene and ethylene monomer to form a random copolymer in the presence of a catalyst system comprising a metallocene catalyst having the general structure:

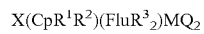

$$X(CpR^1R^2)(FluR^3_2)MQ_2$$

where Cp is a cyclopentadienyl ring; Flu is a fluorenyl ring; X is a propylidene group; $R^1$ is a tert-butyl group on the cyclopentadienyl ring which is distal to the bridge $R^2$ is a methyl group on the cyclopentadienyl ring which is proximal to the bridge and positioned non-vicinal to the distal substituent; each $R^3$ is the same or different and is a hydrogen or a hydrocarbyl having from 1 to 20 carbon atoms with one $R^3$ being substituted at a position selected from 2, 3 or 4 on the fluorenyl group and the other $R^3$ being substituted at a position selected from 5, 6 or 7 on the fluorenyl group; M is zirconium; and each Q is chlorine, wherein the process exhibits a ratio of ethylene incorporation to ethylene feed concentration of from about 4:1 to about 15:1.

* * * * *